UNITED STATES PATENT OFFICE.

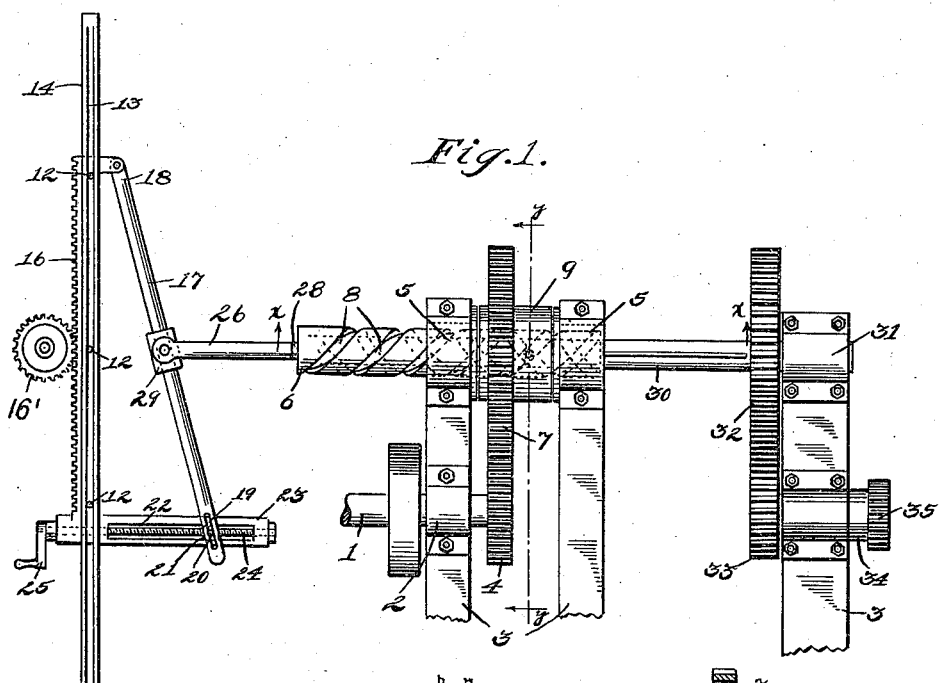

KARL HOEPFNER, OF CHICAGO, ILLINOIS.

MECHANICAL MOVEMENT.

965,460.  Specification of Letters Patent.  Patented July 26, 1910.

Application filed March 28, 1910. Serial No. 551,997.

*To all whom it may concern:*

Be it known that I, KARL HOEPFNER, a subject of the Emperor of Germany, residing at Chicago, county of Cook, and State of Illinois, have invented a certain new and useful Mechanical Movement, of which the following is a specification.

My invention relates to a new mechanical movement and has for its object to provide mechanism adapted for the production of differential motion.

A further object of my invention is the provision of mechanism adapted for such production which will be of economical, comparatively simple construction, and efficient in operation.

Other objects will appear hereinafter.

With these objects in view my invention consists in the provision of mechanism characterized as above mentioned and in certain details of construction and arrangement of parts all as will be hereinafter fully described and particularly pointed out in the appended claims.

My invention will be more readily understood by reference to the accompanying drawing forming a part of this specification, and in which—

Figure 1 is an elevation of mechanism embodying the preferred form of my invention, Fig. 2 is a longitudinal section taken on line *x—x* of Fig. 1, Fig. 3 is an enlarged transverse section taken on line *y—y* of Fig. 1, and Fig. 4 is a detail of one of the thrust bearings included in the mechanism.

Referring now to the drawing, 1 designates a power or drive shaft which is mounted in bearings 2 supported upon the supporting frame 3, said shaft being driven by any suitable means (not shown). Carried by said shaft is a pinion 4. Slidably and rotatably mounted in bearings 5 provided upon the frame 3 is a tubular shaft 6 loosely mounted upon which is a gear wheel 7 meshing with the pinion 4, the bearings 5 being arranged and designed so as to adapt the same to also serve as thrust ball-bearings for the said gear wheel. Provided in the outer surface of the shaft 6 are helical grooves 8 preferably two in number, said grooves being positioned in said shaft in diametrically opposite positions. Provided in the hub 9 of the gear 7 at diametrically opposite points therein are inwardly projecting studs 10 carrying rollers 11 at their inner ends engaging the grooves 8, as clearly shown in Fig. 3. An operative connection between said gear 7 and the shaft 6 is thus effected through the sole medium of the studs 10.

Slidably mounted adjacent one extremity of the shaft 6, the same being preferably provided with projecting studs 12 engaging a guide groove 13 in a stationary or rigidly supported frame bar 14, is a rack bar 16. A driven pinion 16' meshes with said rack bar whereby the latter evidently may be slid or moved in either direction transversely of the axis of the shaft 6. Carried by the bar 16 is an angularly adjustable bar 17, one extremity 18 thereof being pivotally secured to one extremity of said bar, the opposite extremity thereof being provided with an elongated slot 19 for engagement of a stud 20 projecting from a block 21 slidably mounted in a slot 22 provided in an arm 23 projecting from the opposite extremity of said bar. Said block is threaded upon a feeding screw 24 rotatably mounted in the arm 23, and said screw is provided with a crank handle whereby the same may be readily rotated in order to slide said block in the slot 22. Thus the bar 17 may evidently be adjusted to any angular disposition.

A rod 26 is connected at one extremity to one end of the shaft 6 by means of a screwbolt 27 in such a manner as to permit of free rotation of said shaft independent thereof, a lock nut 28 threaded upon the bolt 27 serving an obvious purpose. The opposite extremity of the rod 26 is connected to a block 29 in slidable connection with the bar 17. With this construction it will be seen that upon the sliding actuation of the rack bar 16 and hence of the bar 17, the shaft 6 will be moved longitudinally in its bearings and hence through the gear 7 in a direction depending upon the direction of movement of the former. Because of the pin and helical groove connection between said shaft and the gear 7, said shaft, upon the longitudinal movement thereof, will evidently be rotated in its bearings and in said gear. Hence upon such longitudinal movement of said shaft, with said gear 7 rotating as caused by the pinion 4, the rotatory speed of said shaft relative to that of said gear will evidently be either accelerated or retarded depending upon the relative direction of movement of said shaft and gear.

Splined to the shaft 6 is a shaft 30 mounted at its outer extremity in a bearing 31. Carried at the outer extremity of the shaft 30 is a pinion 32 of the same size as the pinion 7. Meshing with said pinion 32 is a gear wheel 33 carried by a shaft 34, said gear wheel being of the same size as the gear wheel 4. A pinion 35 carried by the shaft 34 constitutes the operating pinion of any machine or mechanism in conjunction with which the present mechanism might be used. Under ordinary circumstances the gearing described would evidently result in the driving of the pinions 4 and 35 at equal speeds. With this arrangement however, upon operation, as before described, the acceleration or retardation of rotary movement of the shaft 6 will be communicated to the pinion 35, the same being therefore differentially driven relative to the pinion 4. By regulating the speed of movement of the bar 17 and by adjusting the angular disposition thereof, any degree of acceleration or retardation of the pinion 35 relative of the pinion 4 may evidently be effected.

The above described device may be used on any mechanism to which it is applicable but is especially adapted for use on bevel gear cutting machines where the constant variation in speed between the two shafts 1 and 34 is utilized to effect the constant variation in cutting width of a milling cutter. Such an application of this device is illustrated and described in my co-pending application for machine tools, filed April 18, 1910, Serial No. 556,188.

While I have shown what I deem to be the preferable form of my mechanism I do not wish to be limited thereto as there might be many changes made in the details of construction and the arrangement of parts described without departing from the spirit of the invention comprehended within the scope of the appended claims.

Having described my invention what I claim as new and desire to secure by Letters Patent is:

1. In a mechanical movement, the combination of two rotatable members mounted to normally rotate together; an operative connection between said members adapted to cause relative rotation of said members during their rotations, and means for utilizing the rotations of both members, substantially as described.

2. In a mechanical movement, the combination of two rotatable members mounted co-axially; a longitudinally movable member having a splined connection with one of said members and a steep screw thread connection with the other; means for moving said longitudinal member; means for rotating one of said rotatable members; and means for utilizing the rotations of both of said rotatable members, substantially as described.

3. The combination of a shaft slidably and rotatably mounted and having a helical groove in the outer surface thereof, a rotatable member loosely mounted upon said shaft, an operative connection between said rotatable member and said groove, and a second rotatably mounted shaft in operative connection with said first named shaft, substantially as described.

4. The combination of a shaft slidably and rotatably mounted and having helical grooves in the outer surface thereof, a rotatable member loosely mounted upon said shaft carrying inwardly extending projections engaging said grooves, and a second rotatably mounted shaft in operative connection with said first named shaft, substantially as described.

5. The combination of a shaft slidably and rotatably mounted and having helical grooves in the outer surface thereof, a driven rotatable member loosely mounted upon said shaft, studs inwardly projecting from said member engaging said helical grooves, and rotatable driving means operatively connected with said shaft, substantially as described.

6. The combination of a shaft slidably and rotatably mounted and having helical grooves in the peripheral surface thereof, a driven gear loosely mounted upon said shaft, studs carried by said gear engaging said grooves, a second shaft operatively connected with said first named shaft, and means for longitudinally feeding said first named shaft, substantially as described.

7. The combination of a shaft slidably and rotatably mounted and having helical grooves in the peripheral surface thereof, a gear wheel loosely mounted upon said shaft, thrust bearings for holding said gear against longitudinal movement relative to said shaft, studs carried by said gear loosely engaging said grooves, a second shaft splined to said first named shaft, and means for longitudinally moving said first named shaft, substantially as described.

8. The combination of a shaft slidably and rotatably mounted and having helical grooves in the periphery thereof, a driven gear loosely mounted upon said shaft, thrust bearings for said gear, studs carried by said gear loosely engaging said grooves, a second shaft splined to said first named shaft, and adjustable means for longitudinally moving said first named shaft, substantially as described.

9. The combination of a shaft slidably and rotatably mounted and having helical grooves in the periphery thereof, a driven gear loosely mounted upon said shaft, thrust bearings for said gear, studs carried by said gear loosely engaging said grooves, a second shaft splined to said first named shaft, adjustable means for longitudinally moving said first named shaft, said means comprising an angularly adjustable bar, and an operative connection between said bar and said shaft whereby upon transverse movement of said bar longitudinal movement will be imparted to said shaft, substantially as described.

In testimony whereof I have signed my name to this specification in the presence of two subscribing witnesses.

KARL HOEPFNER.

Witnesses:
JANET E. HOGAN,
JOSHUA R. H. POTTS.